(12) United States Patent
Jung et al.

(10) Patent No.: US 8,037,008 B2
(45) Date of Patent: Oct. 11, 2011

(54) DBMS-BASED KNOWLEDGE EXTENSION AND INFERENCE SERVICE METHOD RECORDED ON COMPUTER-READABLE MEDIUM

(75) Inventors: Han Min Jung, Daejeon (KR); Pyung Kim, Daejeon (KR); In Su Kang, Gyeongsangbuk-Do (KR); Seoung Woo Lee, Daejeon (KR); Mi Kyung Lee, Gyeongsangbuk-Do (KR); Won Kyung Sung, Daejeon (KR); Dong In Park, Seoul (KR)

(73) Assignee: Korea Institute of Science & Technology Information, Daejeon (KR)

( * ) Notice: Subject to any disclaimer, the term of this patent is extended or adjusted under 35 U.S.C. 154(b) by 59 days.

(21) Appl. No.: 11/883,129

(22) PCT Filed: Oct. 12, 2006

(86) PCT No.: PCT/KR2006/004095
§ 371 (c)(1),
(2), (4) Date: Jul. 26, 2007

(87) PCT Pub. No.: WO2008/026794
PCT Pub. Date: Mar. 6, 2008

(65) Prior Publication Data
US 2010/0049763 A1   Feb. 25, 2010

(30) Foreign Application Priority Data
Aug. 28, 2006   (KR) .................. 10-2006-0081785

(51) Int. Cl.
*G06F 17/00* (2006.01)
*G06N 7/00* (2006.01)
*G06N 7/08* (2006.01)

(52) U.S. Cl. ....................................... 706/59

(58) Field of Classification Search ................ 707/721; 706/59
See application file for complete search history.

(56) References Cited

U.S. PATENT DOCUMENTS
2004/0210552 A1* 10/2004 Friedman et al. ................ 707/1
(Continued)

FOREIGN PATENT DOCUMENTS
JP         2004-102790 A      4/2004
(Continued)

OTHER PUBLICATIONS
'The Index Organizations for RDF and RDF Schema', Kim, Feb. 20-22, 2006, IEEE Cat Num 06EX1209, pp. 1871-1874.*
(Continued)

*Primary Examiner* — Omar F Fernandez Rivas
*Assistant Examiner* — Peter Coughlan
(74) *Attorney, Agent, or Firm* — LRK Patent Law Firm (57) ABSTRACT

A DBMS-based knowledge extension and inference service method recorded on a computer-readable medium includes creating knowledge represented as a triple by using ontology schemas and instances (first step); receiving the knowledge and extending the knowledge by using a knowledge extension rule (second step); and providing an inference service by using the extended knowledge, converting a user query, and processing the query (third step). Further, the third step includes receiving and converting a user query to create the converted query (31st step); determining whether the query is a previously-input query (32nd step); receiving the converted query and the determination result to create a query result (33rd step); receiving the query result of the 33rd step and performing post-processing to create a post-processing result (34th step); and creating a message and protocol suitable for a user interface by using the post-processing result and then presenting an inference result.

15 Claims, 7 Drawing Sheets

U.S. PATENT DOCUMENTS

2004/0243633 A1 12/2004 Thompson et al.
2006/0074980 A1* 4/2006 Sarkar .................. 707/104.1

FOREIGN PATENT DOCUMENTS

| KR | 0492785 B1 | 6/2005 |
| KR | 0519979 B1 | 10/2005 |
| KR | 0558331 B1 | 3/2006 |
| KR | 10-2006-0066587 A | 6/2006 |

OTHER PUBLICATIONS

European Search Report for Eurepean Patent Application No. 06799175.2 which corresponds to U.S. Appl. No. 11/883,129.
Jeremy J. Carroll, Ian Dickinson, Chris Dollin: "Jena: Implementing the Semantic Web Recommendations", Proceedings of the 13th international conference on World Wide Web—Alternate Track Papers & Posters, WWW 2004, New York, NY, USA. May 20, 2004, pp. 74-83, XP002588476 DOI: 10.1.1.2.2412.
Broekstra et al.: "Sesame: A Generic Architecture for Storing and Querying RDF and RDF Schema", Lecture Notes in Computer Science, Springer, DE, vol. 2342, Jun. 9, 2002, pp. 1-15, XP002320753 ISSN: 0302-9743.
Aimilia Magkanaraki, Grigoris Karvounarakis, Ta Tuan Anh, Vassilis Christophides, Dimitris Plexousakis: "Ontology, Storage and Querying" Foundation for Research and Technology Hellas, Institute of Computer Science, Information Systems Laboratory Technical Report vol. 308, Apr. 30, 2002, XP002588158 DOI: 10.1.1.64.638.
Steve Harris: "SPARQL query processing with conventional relational database systems" Web Information Systems Engineering—WISE 2005 Workshops vol. 3807/2005, Dec. 31, 2005, pp. 235-244, XP002588477 DOI: 10.1007/11581116_25.
International Search Report for International Application No. PCT/KR2006/004095 which corresponds to the U.S. Appl. No. 11/883,129.

* cited by examiner

ONTOLOGY SCHEMA

```
<?xml version="1.0"?>
<rdf:RDF
  xmlns="http://www.kisti.re.kr/isrl#"
  xmlns:rdf="http://www.w3.org/1999/02/22-rdf-syntax-ns#"
  xmlns:xsd="http://www.w3.org/2001/XMLSchema#"
  xmlns:rdfs="http://www.w3.org/2000/01/rdf-schema#"
  xmlns:owl="http://www.w3.org/2002/07/owl#"
  xml:base="http://www.kisti.re.kr/isrl">
  <owl:Ontology rdf:about=""/>
  <owl:Class rdf:ID="CreationInformation">
    <rdfs:subClassOf>
      <owl:Restriction>
        <owl:onProperty>
          <owl:ObjectProperty rdf:ID="hasCreator"/>
        </owl:onProperty>
        <owl:allValuesFrom>
          <owl:Class rdf:ID="Person"/>
        </owl:allValuesFrom>
      </owl:Restriction>
    </rdfs:subClassOf>
...
```

RDF/XML PARSER

PARSING RESULT

```
[isrl:Outcomes, rdf:type, owl:Class]
[isrl:Paper, rdf:type, owl:Class]
[isrl:Article, rdf:type, owl:Class]
...
[isrl:Paper, rdfs:subClassOf, isrl:Outcomes]
[isrl:Article, rdfs:subClassOf, isrl:Paper]
...
[isrl:hasPublication, rdf:type, owl:ObjectProperty]
[isrl:hasPublication, rdfs:domain, isrl:Article]
[isrl:hasPublication, rdfs:range, isrl:Publication]
...
```

[Fig. 5]

FILED INFORMATION AND VALUES IN DBMS

| | | | | |
|---|---|---|---|---|
| F1 | OBJECT URI | KISTI1.PCD.123456 | | |
| F2 | TITLE | INFERENCE TREND ON SEMANTIC WEB | | |
| F3 | YEAR | 2006 | | |
| WRITER | F4 | F5 | F6 | F7 |
| | ORDER | MAN POWER URI | INSTITUTION URI | WEIGHT |
| | 1 | 7010186243 | 9R9048 | 0.93 |
| | 2 | 6410136403 | 9R9048 | 0.85 |
| TOPIC | F8 | F9 | F10 | |
| | ORDER | TOPIC URI | WEIGHT | |
| | 1 | IT000001 | 0.9 | |
| | 2 | IT000002 | 0.65 | |
| | 2 | IT000003 | 0.5 | |
| CATEGORY | F11 | F12 | F13 | |
| | ORDER | CATEGORY URI | WEIGHT | |
| | 1 | 030214 | 0.89 | |
| | 2 | 040503 | 0.77 | |
| | 2 | 040502 | 0.4 | |

DB-TRIPLE CONVERSION RULE

```
<F1> rdf:type isrl:Outcomes
{F4
  <F1> isrl:hasCreationInformation
  <F1>_[F5]
  <F1>_[F5] rdf:type isrl:CreationInformation
  <F1>_[F5] isrl:orderOfCreator [F4]
  <F1>_[F5] isrl:hasCreator [F5]
  <F1>_[F5] isrl:hasInstitutionOfCreator [F6]
  <F1>_[F5] isrl:contributionWeightOfCreator [F7]
}
{F8
  <F1> isrl:hasTopicDomain <F1>_[F9]
  <F1>_[F9] rdf:type isrl:hasTopicDomain
  <F1>_[F9] isrl:orderOfTopicKeyword [F8]
  <F1>_[F9] isrl:hasTopicKeyword [F9]
  <F1>_[F9] isrl:WeightOfTopicKeyword [F10]
}
{F11
  <F1> isrl:hasCategoryDomain <F1>_[F12]
  <F1>_[F12] rdf:type isrl:hasCategoryDomain
  <F1>_[F12] isrl:orderOfCategoryKeyword [F11]
  <F1>_[F12] isrl:hasCategoryKeyword [F12]
  <F1>_[F12] isrl:WeightOfCategoryKeyword [F13]
}
```

[Fig. 6]

isrl:OBJ_KISTI1.PCD.123456 rdf:type isrl:Outcomes
isrl:OBJ_KISTI1.PCD.123456 isrl:hasCreationInformation isrl:KISTI1.PCD.123456_7010186243
isrl:KISTI1.PCD.123456_7010186243 rdf:type isrl:CreationInformation
isrl:KISTI1.PCD.123456_7010186243 isrl:orderOfCreator xsd:1
isrl:KISTI1.PCD.123456_7010186243 isrl:hasCreator isrl:PER_7010186243
isrl:KISTI1.PCD.123456_7010186243 isrl:hasInstitutionOfCreator isrl:INS_9R9048
isrl:KISTI1.PCD.123456_7010186243 isrl:contributionWeightOfCreator xsd:0.93
isrl:OBJ_KISTI1.PCD.123456 isrl:hasCreationInformation isrl:KISTI1.PCD.123456_6410136403
isrl:KISTI1.PCD.123456_6410136403 rdf:type isrl:CreationInformation
isrl:KISTI1.PCD.123456_6410136403 isrl:orderOfCreator xsd:2
isrl:KISTI1.PCD.123456_6410136403 isrl:hasCreator isrl:PER_6410136403
isrl:KISTI1.PCD.123456_6410136403 isrl:hasInstitutionOfCreator isrl:INS_9R9048
isrl:KISTI1.PCD.123456_6410136403 isrl:contributionWeightOfCreator xsd:0.85

- Article
  - x hasPublication y, y yearOfPublication z -> x hasPublicationYear z
- Thesis
  - x yearOfPublishingThesis y -> x hasPublicationYear z
- Patent
  - x yearOfApplication y -> x hasPublicationYear y
- Report
  - x hasOriginatedProject y, y endingYearOfProject z -> x hasPublicationYear z
- Man
  - x hasCreationInformation y, y hasCreator z -> x createdByPerson z
  - x hasInstitutionOfPerson y, y hasLocationOfInstitution z -> x locatedIn z
  - x createdByPerson y -> y creatorOf x
  - Weight of Outcome for Each Writer (extension triple x)
    - x hasCreationInformation y, y hasCreator z, y contributionWeightOfCreator z
- Institution
  - x hasCreationInformation y, y hasInstitutionOfCreator z -> x createdByInstitution z
- Region
  - x createdByInstitution y, y hasLocationOfInstitution z -> x createdByLocation z

[Fig. 9]

USER QUERY (SPARQL USED)

```
PREFIX rdf: <http://www.w3.org/1999/02/22-rdf-syntax-ns#>
PREFIX isrl: <http://www.kisti.re.kr/isrl#>
SELECT ?creator ?score
WHERE
{
        ?outcome rdf:type T .
        ?outcome isrl:isClassifiedBy ?S . FILTER(?S=S1 || ?S=S2 || ?S=S3) .
        ?outcome isrl:isCategorizedBy ?C . FILTER(?C=C1 || ?C=C2 || ?C=C3) .
        ?outcome isrl:hasPublicationYear ?Y . FILTER(?Y>=Y1 && ?Y<=Y2) .
        ?outcome isrl:hasCreationInformation ?CI .
        ?CI isrl:hasCreator ?creator .
        ?CI isrl:contributionWeightOfCreator ?score .
}
ORDER BY ?creator
```

CONVERTED QUERY (SQL)

```
SELECT T6.obj AS creator, T7.obj AS score
FROM Triples AS T1, Triples AS T2, Triples AS T3, Triples AS T4, Triples AS T5, Triples AS T6, Triples AS T7
WHERE T1.pred='rdf:type' AND T1.obj=T
AND T2.pred='isrl:isClassifiedBy' AND T2.sub=T1.sub AND (T2.obj=S1 OR T2.obj=S2 OR T2.obj=S3)
AND T3.pred='isrl:isCategorizedBy' AND T3.sub=T1.sub AND (T3.obj=C1 OR T3.obj=C2 OR T3.obj=C3)
AND T4.pred='isrl:hasPublicationYear' AND T4.sub=T1.sub AND T4.obj >= Y1 AND T4.obj <= Y2
AND T5.pred='isrl:hasCreationInformation' AND T5.sub=T1.sub
AND T6.pred='isrl:hasCreator' AND T6.sub=T5.obj
AND T7.pred='isrl:contributionWeightOfCreator' AND T7.sub=T5.obj
ORDER BY creator
```

[Fig. 10]

| creator | score |
|---|---|
| isrl:PER_0000000037 | 0.09 |
| isrl:PER_0000000119 | 0.12 |
| isrl:PER_0000000119 | 0.2 |
| isrl:PER_0000000119 | 0.2 |
| isrl:PER_0000001182 | 0.2 |
| isrl:PER_0000001182 | 0.3 |
| isrl:PER_0000001207 | 0.25 |
| isrl:PER_0000001259 | 0.2 |
| isrl:PER_0000001582 | 0.1 |
| isrl:PER_0000001582 | 0.1 |
| isrl:PER_0000001766 | 0.25 |
| isrl:PER_0000001766 | 0.25 |
| isrl:PER_0000001766 | 0.25 |
| isrl:PER_0000001858 | 0.15 |
| isrl:PER_0000001858 | 0.15 |
| isrl:PER_0000001885 | 0.15 |
| isrl:PER_0000001885 | 0.2 |
| isrl:PER_0000001885 | 0.25 |
| isrl:PER_0000001885 | 0.25 |
| isrl:PER_0000002072 | 0.23 |
| isrl:PER_0000002072 | 0.25 |
| isrl:PER_0000002653 | 0.2 |
| isrl:PER_0000002653 | 0.2 |
| isrl:PER_0000002653 | 0.2 |
| isrl:PER_0000003017 | 0.29 |
| isrl:PER_0000003097 | 0.12 |
| isrl:PER_0000003433 | 0.2 |
| isrl:PER_0000004749 | 0.15 |
| isrl:PER_0000004749 | 0.15 |

| creator | score |
|---|---|
| isrl:PER_0000004749 | 0.15 |
| isrl:PER_0000004863 | 0.2 |
| isrl:PER_0000004863 | 0.2 |
| isrl:PER_0000004914 | 0.19 |
| isrl:PER_0000004914 | 0.2 |
| isrl:PER_0000005081 | 0.2 |
| isrl:PER_0000005098 | 0.12 |
| isrl:PER_0000005098 | 0.15 |
| isrl:PER_0000005098 | 0.2 |
| isrl:PER_0000005128 | 0.1 |
| isrl:PER_0000005128 | 0.1 |
| isrl:PER_0000005128 | 0.2 |
| isrl:PER_0000005128 | 0.2 |
| isrl:PER_0000005128 | 0.3 |
| isrl:PER_0000005171 | 0.27 |
| isrl:PER_0000005171 | 0.3 |
| isrl:PER_0000005299 | 0.27 |
| isrl:PER_0000005299 | 0.27 |
| isrl:PER_0000005473 | 0.2 |
| isrl:PER_0000005473 | 0.2 |
| isrl:PER_0000005473 | 0.2 |
| isrl:PER_0000005677 | 0.1 |
| isrl:PER_0000005677 | 0.15 |
| isrl:PER_0000005677 | 0.15 |
| isrl:PER_0000005677 | 0.2 |
| isrl:PER_0000005677 | 0.35 |
| isrl:PER_0000007459 | 0.15 |
| isrl:PER_0000007459 | 0.15 |
| isrl:PER_0000007543 | 0.3 |
| isrl:PER_0000007756 | 0.1 |
| isrl:PER_0000007756 | 0.15 |
| isrl:PER_0000009110 | 0.12 |
| isrl:PER_0000009110 | 0.12 |
| isrl:PER_0000033129 | 0.2 |
| isrl:PER_0000033129 | 0.12 |
| isrl:PER_0000035326 | 0.2 |

| creator | score |
|---|---|
| isrl:PER_0000122600 | 0.3 |
| isrl:PER_0000126438 | 0.28 |
| isrl:PER_0000230598 | 0.1 |
| isrl:PER_0000230598 | 0.1 |
| isrl:PER_0000230598 | 0.15 |
| isrl:PER_0000234853 | 0.25 |
| isrl:PER_0000331954 | 0.2 |
| isrl:PER_0000520053 | 0.3 |
| isrl:PER_0000991253 | 0.2 |
| isrl:PER_0000991280 | 0.21 |
| isrl:PER_5120045294 | 0.15 |
| isrl:PER_5120045294 | 0.19 |
| isrl:PER_5210000496 | 0.12 |
| isrl:PER_5210046694 | 0.1 |
| isrl:PER_5210046694 | 0.15 |
| isrl:PER_5210046694 | 0.2 |
| isrl:PER_5210046694 | 0.25 |
| isrl:PER_5310052979 | 0.3 |
| isrl:PER_5310052979 | 0.35 |
| isrl:PER_6110109553 | 0.2 |
| isrl:PER_6110109553 | 0.23 |
| isrl:PER_6110124323 | 0.1 |
| isrl:PER_6120114234 | 0.25 |
| isrl:PER_6120114234 | 0.3 |
| isrl:PER_8210377175 | 0.19 |
| isrl:PER_8210377175 | 0.3 |
| isrl:PER_8230117577 | 0.29 |
| ... | |

[Fig. 11]

| | |
|---|---|
| isrl:PER_0000005677 | 0.95 |
| isrl:PER_0000005128 | 0.9 |
| isrl:PER_0000001885 | 0.85 |
| isrl:PER_0000002653 | 0.8 |
| isrl:PER_0000001766 | 0.75 |
| isrl:PER_5210046694 | 0.7 |
| isrl:PER_5310052979 | 0.65 |
| isrl:PER_0000005473 | 0.6 |
| isrl:PER_0000005171 | 0.57 |
| isrl:PER_6120114234 | 0.55 |
| isrl:PER_0000005299 | 0.54 |
| isrl:PER_0000000119 | 0.52 |
| isrl:PER_0000001182 | 0.5 |
| isrl:PER_8210377175 | 0.49 |
| isrl:PER_0000002072 | 0.48 |
| isrl:PER_0000005098 | 0.47 |
| isrl:PER_0000004749 | 0.45 |
| isrl:PER_6110109553 | 0.43 |
| isrl:PER_0000004863 | 0.4 |
| isrl:PER_0000004914 | 0.39 |

[Fig. 12]

```
<?xml version="1.0" encoding="UTF-8"?>
<!--Sample XML file generated by XMLSpy v2005 sp2 U (http://www.altova.com)-->
<ResultData xmlns:xsi="http://www.w3.org/2001/XMLSchema-instance" xsi:noNamespaceSchemaLocation=".\[IP1-1] ResearcherNetwork _v1.0.xsd">
    <OutcomesExpert>
        <ExpertNum>20</ExpertNum>
        <ExpertList>
            <Expert>
                <Ranking>1</Ranking>
                <HumURI>http://www.kisti.re.kr/isrl#PER_0000005677</HumURI>
                <HumName> Hong Sung-Joon </HumName>
                <Weight>0.95</Weight>
            </Expert>
            <Expert>
                <Ranking>2</Ranking>
                <HumURI>http://www.kisti.re.kr/isrl#PER_0000005128</HumURI>
                <HumName> Park MI-Na </HumName>
                <Weight>0.9</Weight>
            </Expert>
            <Expert>
                <Ranking>6</Ranking>
                <HumURI>http://www.kisti.re.kr/isrl#PER_5210046694</HumURI>
                <HumName> Lim Jae-Gul </HumName>
                <Weight>0.7</Weight>
            </Expert>
            ...
            <Expert>
                <Ranking>20</Ranking>
                <HumURI>http://www.kisti.re.kr/isrl#PER_0000004914</HumURI>
                <HumName> Cho Il-Gook </HumName>
                <Weight>0.39</Weight>
            </Expert>
        </ExpertList>
    </OutcomesExpert>
    <Message> Researcher Network for Top Twenty Researchers among 7,496 Researchers </Message>
</ResultData>
```

DBMS-BASED KNOWLEDGE EXTENSION AND INFERENCE SERVICE METHOD RECORDED ON COMPUTER-READABLE MEDIUM

CLAIM OF PRIORITY

This application claims priority under 35 USC 371 to International Application No. PCT/KR2006/004095, filed on Oct. 12, 2006, which claims priority to Korean Patent Application No. 10-2006-0081785, filed on Aug. 28, 2006, each of which is incorporated by reference in its entirety.

TECHNICAL FIELD

The present invention relates to a DBMS (Database Management system)-based knowledge extension and inference service system and a method for the same. In the DBMS-based knowledge extension and inference service system and the method for the same, ontology is used to create knowledge, the knowledge is extended by using an extension rule, and an inference service is provided through query processing, thereby proposing a framework which is stable and effective in all fields where the Semantic Web is utilized and an inference service needs to be provided. Therefore, it is possible to achieve the common use of the Semantic Web service.

BACKGROUND ART

Recently, the age where the web is used to simply show information to a user has changed into a new age where the software of a user receives a result so as to automatically process a lot of tasks. When a web service technology is applied to various services such as electronic commercial transaction and information searching which are currently achieved on the web, a lot of tasks which have not been automatically processed so far can be automated. Then, it is possible to maximize the productivity and effectiveness of information systems as well as the convenience of users.

Recently, the structure of information existing on the web is being changed. That is, information having a new form, which can be analyzed and processed by computers, is being added to the existing information. The information is referred to as meta data. When the meta data is added into the current web, computers can analyze the meaning of information through the meta data and processes the information, which is referred to as 'Semantic Web'.

Particularly, when the Semantic Web is applied to electronic commercial transaction, a lot of tasks which have not been able to be processed can be automatically processed. In a typical type of Internet shopping, a purchaser visits Internet shopping malls, sees products, and selects a product to purchase. On the Semantic Web, however, meta information on a product standard, a transaction condition and the like as well as product information is provided in each Internet shopping mall. In such an environment, computers can perform price negotiation as well as searching of a desired product in place of people.

The Semantic Web can be effectively utilized in a B-to-B system integration field and a value-added searching field as well as in the electronic commercial transaction. Further, the Semantic Web is considered to be a core technology which can change the paradigm of information communication in the near future.

In the existing web service, the WSDL (Web Service Description Language) based on XML (extensible Markup Language) is used. In the Semantic Web service, however, a web service description language such as DAML-S (DAPRA Agent Markup Language-Service) based on an ontology language is used. Researches on the Semantic Web service are performed in view of web service searching, web service driving, web service configuration, web service execution monitoring and the like. Particularly, the Semantic Web service searching is a base field for achieving an ultimate purpose of the Semantic Web service and has different features from the existing information searching. That is, a storage system and a searching method are required, which are suitable for the Semantic Web description language.

Conventionally, attempts to use a DMBS in the Semantic Web service have been made at a research level once in a while. In such attempts, however, the DMBS serves as only a storing place. Therefore, the DMBS is not closely combined with the overall information flow including knowledge creation, knowledge extension, and knowledge provision.

In conventional similar systems for the Semantic Web service, the DMBS is partially utilized, which means there is a limit in the performance of inference service.

Accordingly, in the present invention, the overall process of creating an inference result from an ontology schema is consistently constructed so as to maximize the performance.

DISCLOSURE

Technical Problem

An advantage of the present invention is that it provides a DBMS (Database Management system)-based knowledge extension and inference service system and a method for the same. In the DBMS-based knowledge extension and inference service system and the method for the same, ontology is used to create knowledge, the knowledge is extended by using an extension rule, and an inference service is provided through query processing, thereby proposing a framework which is stable and effective in all fields where the Semantic Web is utilized and an inference service needs to be provided. Therefore, it is possible to achieve the common use of the Semantic Web service.

Technical Solution

According to an aspect of the invention, a DBMS-based knowledge extension and inference service method recorded on a computer-readable medium includes creating knowledge represented as a triple by using ontology schemas and instances (first step); receiving the knowledge created in the first step and extending the knowledge by using a knowledge extension rule (second step); and providing an inference service by using the knowledge extended in the second step, converting a user query, and processing the query (third step). Further, the third step includes receiving and converting a user query so as to create the converted query (31st step); determining whether the query is a previously-input query (32nd step); receiving the query converted in the 31st step and the determination result of the 32nd step so as to create a query result (33rd step); receiving the query result of the 33rd step and performing post-processing so as to create a post-processing result (34th step); and creating a message and protocol suitable for a user interface by using the post-processing result created in the 34th step and then presenting an inference result.

DESCRIPTION OF DRAWINGS

FIG. 9 is a diagram showing an example of user query and converted query in FIG. 1 or 2.

FIG. 10 is a diagram showing an example of query result obtained by referring to DBMS-based extension triple in FIG. 1 or 2.

FIG. 11 is a diagram showing an example of query result obtained by arranging and filtering the query result in FIG. 1 or 2.

FIG. 12 is a diagram showing an example of inference result as an API defined in a user interface by referring to a URI server and using a post-processing result.

BEST MODE

Hereinafter, a DBMS-based knowledge extension and inference service system and a method for the system according to an embodiment of the invention will be described with reference to the drawings.

Figure 1:
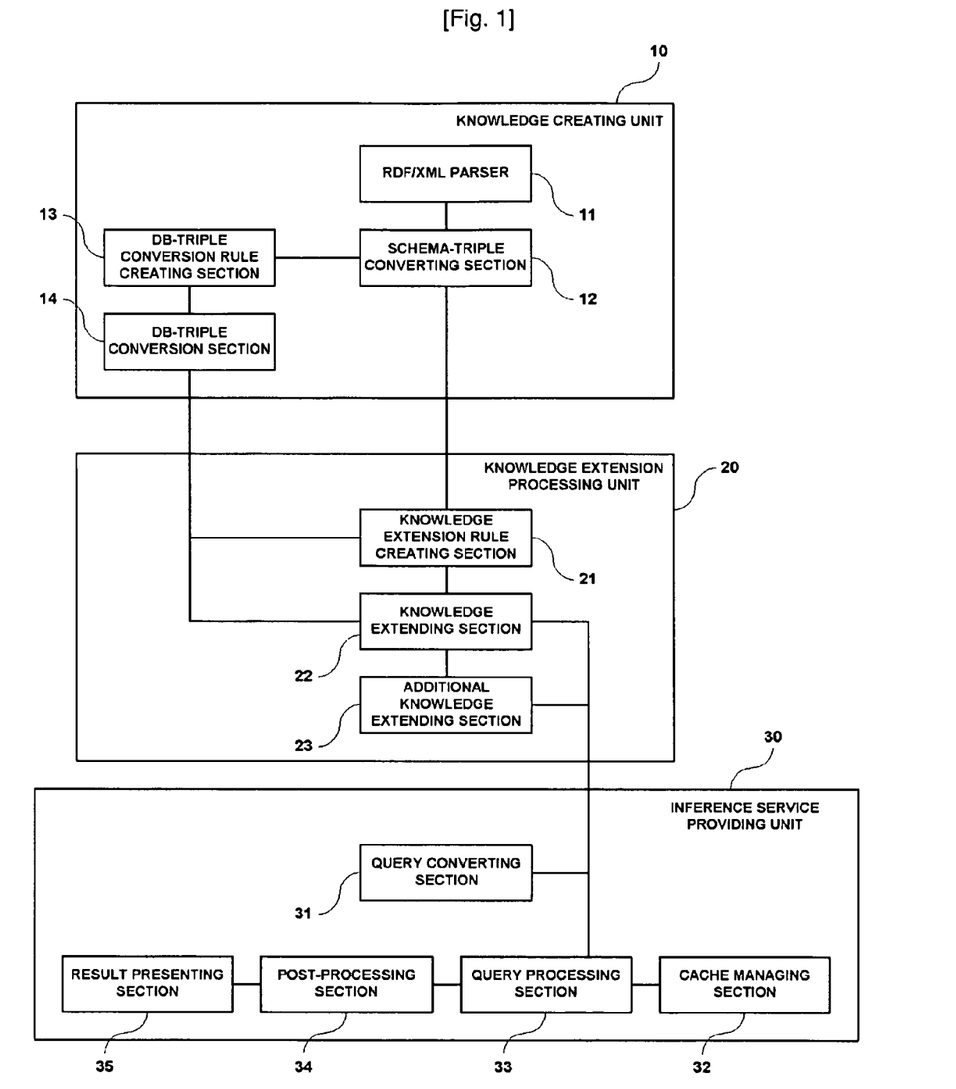
FIG. 1 is a block diagram illustrating a DBMS-based knowledge extension and inference service system according to an embodiment of the invention.

FIG. 1 is a block diagram illustrating a DBMS-based knowledge extension and inference service system according to the invention.

As shown in FIG. 1, the DBMS-based knowledge extension and inference service system includes a knowledge creating unit 10 that creates knowledge represented as a triple by using ontology schemas and instances; a knowledge extension processing unit 20 that receives the knowledge created by the knowledge creating unit 10 and extends the knowledge by using a knowledge extension rule; and an inference service providing unit 30 that provides an inference service by using the knowledge extended by the knowledge extension processing unit 20, converting a user query, and processing the query.

The knowledge creating unit 10 parses an ontology schema, represented by an ontology description language such as RDF or XML, by using an RDF/XML parser so as to output the result. Further, the knowledge creating unit 10 creates a schema triple by using a schema-triple conversion section.

The knowledge creating unit 10 includes an RDF/XML parser 11 that parses an ontology schema so as to output the parsing result; a schema-triple conversion section 12 that receives the parsing result parsed by the RDF/XML parser 11 so as to perform schema-triple conversion; a DB-triple conversion rule creating section 13 that receives the schema-triple converted by the schema-triple conversion section 12, DB-class mapping information, and NS-prefix mapping information so as to create a DB-triple conversion rule; and a DB-triple conversion section 14 that converts an ontology instance stored in an URL server into an instance triple by using the DB-triple conversion rule created by the DB-triple conversion rule creating section 13.

The RDF/XML parser 11 performs a basic operation for converting an ontology schema into a DBMS-based triple and analyzes an ontology schema so as to output a parsing result.

The schema-triple conversion section 12 converts an ontology schema into a form which can be handled by a DBMS.

The DB-triple conversion rule creating section 13 uses the schema triple, the DB-class mapping information, and the NS-prefix mapping information, in order to create a DB-triple conversion rule. Further, the DB-triple conversion rule creating section 13 maps a DBMS field into an ontology class corresponding to a concept by using the DB-class mapping information. Further, the DB-triple conversion rule creating section 13 provides an editing screen and an editor such that the DB-class mapping information can be edited. In addition, the DB-triple conversion rule creating section 13 makes a name space and a prefix compatible with each other by using the NS-prefix mapping information and provides an editing screen and an editor such that the NS-prefix mapping information can be edited. Moreover, the DB-triple provides an editing screen and an editor such that a DB-triple conversion rule described by an ontology expert can be obtained.

The DB-triple conversion section 14 converts an ontology instance into an instance triple, the ontology instance being stored in the URI server or being represented as a character string by using an ontology description language such as OWL (Web Ontology Language).

The knowledge extension processing section 20 receives a schema triple and an instance triple and analyzes a schema-based extension rule and a user-defining extension rule so as to output an extended triple.

The knowledge extension processing unit 20 includes a knowledge extension rule creating section 21 that creates a schema-based extension rule; a knowledge extending section 22 that creates an extended triple by using the schema-based extension rule created by the knowledge extension rule creating section 21, a user-defining extension rule described by an expert, an instance triple, and a schema triple; and an additional knowledge extending section 23 that creates an extended triple, of which the value is dynamically varied, by using the instance triple and the result of the knowledge extending section 22.

The knowledge extension rule creating section 21 creates a schema-based extension rule by referring to the schema triple of the knowledge creating unit 10.

The knowledge extending section 22 performs rule analysis and additional creation of triple in a scheme corresponding to forward chaining in an inference engine.

The additional knowledge extending section 23 receives instance triples and calculates the values on a DBMS table or memory so as to process triples in which the values of specific classes are dynamically varied. Further, the additional knowledge extending section 23 updates or adds the corresponding triple.

The inference service providing unit 30 includes a query converting section 31 that receives a user query and converts the query so as to create the converted query; a cache managing section 32 that determines whether the query is a previously-input query or not; a query processing section 33 that receives the converted query from the query converting section 31 and the determination result of the cache managing section 32 so as to create a query result; a post-processing section 34 that receives the query result of the query processing section 33 and performs post-processing so as to perform a post-processing result; and a result presenting section 35 that creates a message and protocol suitable for a user interface by using the post-processing result created by the post-processing section 34 and presents an inference result.

The query converting section 31 converts a user query into SQL statements such that the user query can approach DBMS-based knowledge, the user query being represented as a specific statement dependent on a query description language, such as SPARQL or RDQL, or a user interface.

By referring to a cache composed of a query/result list, the cache managing section 32 determines whether a query is a previously-input query or not.

When the query is a previously-input query, the query processing section 33 immediately present an inference result to a user. When the query is a newly-input query, the query processing section 33 creates a query result by referring to the extended triple of the knowledge extension processing unit 20.

The post-processing section 34 arranges the query results presented by the query processing section 33 such that the query results are suited for a user interface. Further, the post-processing section 34 removes some of the results (filtering) by applying a specific reference, thereby creating a post-processing result.

The result presenting section 35 creates an inference result by using the query result of the query processing section 33 or the post-processing result of the post-processing section 34. Further, the result presenting section 35 extracts a value connected to a concept-value relation (data-type property) of an inference result creation target URI by referring to the URI server, thereby presenting an inference result.

Figure 2:
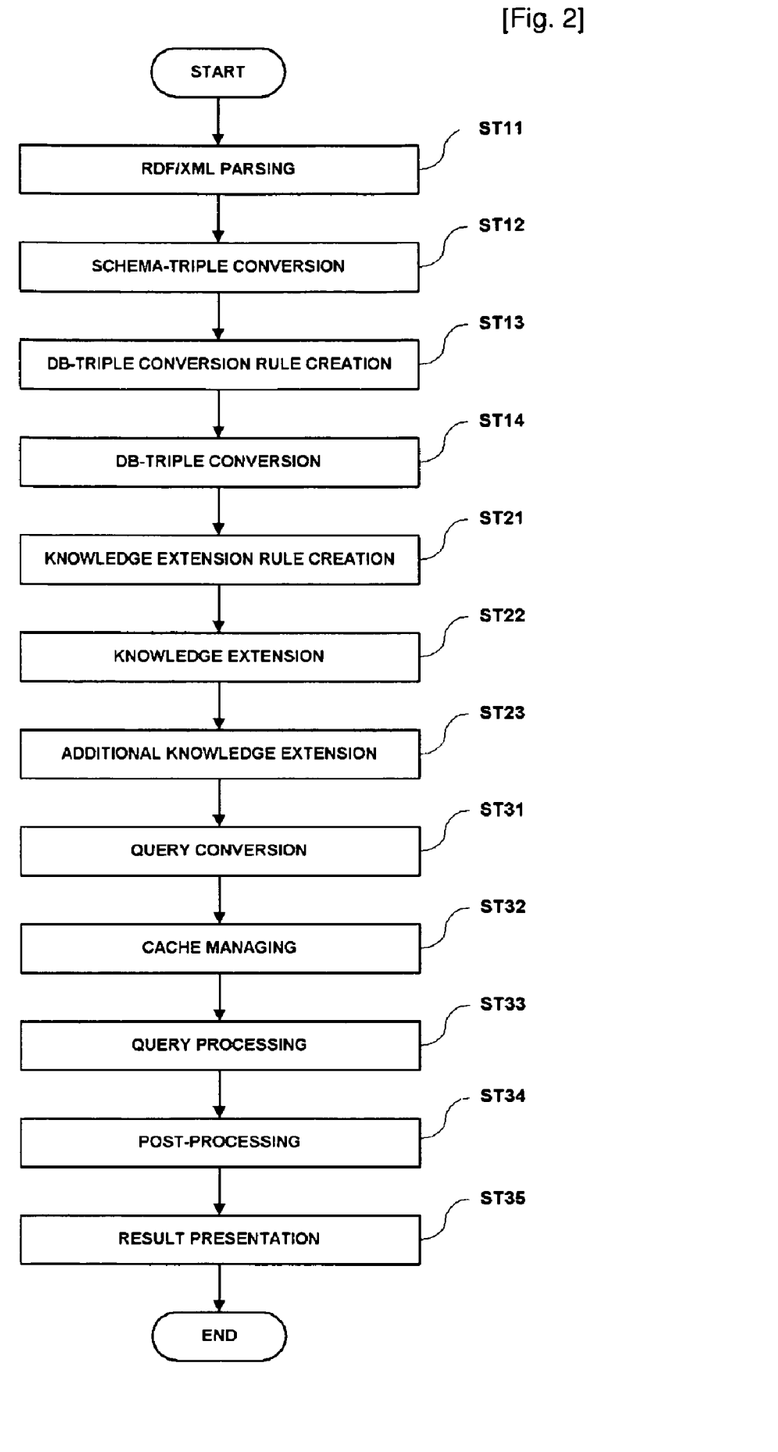
FIG. 2 is a flow chart showing a DBMS-based knowledge extension and inference service method according to an embodiment of the invention.

FIG. 2 is a flow chart showing a DBMS-based knowledge extension and inference service method according to an embodiment of the invention.

As shown in FIG. 2, the DBMS-based knowledge extension and inference service method includes a first step (ST11 to ST14) of creating knowledge represented as a triple by using ontology schemas and instances; a second step (ST21 to ST23) of receiving the created knowledge and extending the knowledge by using a knowledge extension rule; and a third step (ST31 to ST35) of providing an inference service by using the extended knowledge, converting a user query, and processing the query.

In the first step, an ontology schema represented by an ontology description language such as RDF or XML is parsed by the RDF/XML parser so as to create the result, and a schema triple is created by the schema triple conversion section.

The first step includes an eleventh step (ST11) of performing RDF/XML parsing on an ontology schema so as to output a parsing result; a twelfth step (ST12) of receiving the output parsing result so as to perform schema-triple conversion; a thirteenth step (ST13) of receiving the converted schema-triple, DB-class mapping information, and NS-prefix mapping information so as to create a DB-triple conversion rule; and a fourteenth step (ST14) of converting an ontology instance stored in the URL server into an instance triple by using the created DB-triple conversion rule.

In the eleventh step, a basic operation for converting an ontology schema into a DBMS-based triple is performed, and an ontology schema is analyzed so as to output a parsing result.

In the twelfth step, the ontology schema is converted into a form which can be handled by the DBMS.

The thirteenth step includes using a schema triple, DB-class mapping information, and NS-prefix mapping information so as to create a DB-triple conversion rule; mapping a DBMS field into an ontology class corresponding to a concept by using the DB-class mapping information; providing an editing screen and an editor such that the DB-class mapping information is edited; making a name space and a prefix compatible with each other by using the NS-prefix mapping information; providing an editing screen and an editor such that the NS-prefix mapping information is edited; and providing an editing screen and an editor such that a DB-triple conversion rule described by an ontology expert is obtained.

In the fourteenth step, the ontology instance stored in the URI server or represented as a character string by using an ontology description language based on OWL and a topic map is converted into an instance triple.

In the second step, a schema triple and an instance ontology are received, and a schema-based extension rule and a user-defining extension rule are analyzed so as to create an extended triple.

The second step includes a 21st step (ST21) of creating a schema-based extension rule; a 22nd step (ST22) of creating an extended triple by using the schema-based extension rule, a user-defining extension rule described by an expert, an instance triple, and a schema triple; and a 23rd step (ST23) of creating an extended trip, of which the value is dynamically changed, by using the instance triple and the result of the 22nd step.

In the 21st step, the schema-based extension rule is created by referring to the schema triple of the first step.

In the 22nd step, rule analysis and additional creation of triple are performed in a scheme corresponding to forward chaining of an inference engine.

The 23rd step includes receiving the instance triple and calculating a value on a DBMS table or memory such that triples, in which the values of specific classes are dynamically changed, are processed; and updating or adding the corresponding triple.

The third step includes a 31st step (ST31) of receiving and converting a user query so as to create the converted query; a 32nd step (ST32) of determining whether the query is a previously-input query; a 33rd step (ST33) of receiving the query converted in the 31st step and the determination result of the 32nd step so as to create a query result; a 34th step (ST34) of receiving the query result of the 33rd step and performing post-processing so as to create a post-processing result; and a 35th step (ST35) of creating a message and protocol suitable for a user interface by using the post-processing result created in the 34th step and then presenting an inference result.

The 31st step includes converting the user query into SQL statements such that the user query can approach DBMS-based knowledge, the user query being represented by a query description language such as SPARQL or RDQL or as a specific statement dependent on a user interface.

In the 32nd step, a cache composed of a query/result list is referred to in order to determine whether the query is a previously-input query or not.

In the 33rd step, when the query is a previously-input query, an inference result is immediately presented, and when the query is a newly-input query, a query result is created by referring to the extended triple of the second step.

The 34th step includes arranging the query results presented in the 33rd step such that the query results are suited for a user interface, performing filtering by removing some of the results through the application of specific reference, and creating a post-processing result.

In the 35th step, an inference result is created by using the query result of the 33rd step or the post-processing result of the 34th step, and a value connected to a concept-value relation (data-type property) of an inference result creation target URI is extracted by referring to the URI server so as to present the inference result.

Hereinafter, the DBMS-based knowledge extension and inference service system and the method for the same will be described with reference to the drawings. When it is judged that the specific description of related known function or constitution can cloud the point of the invention, the description will be omitted. Terms to be described below are defined in consideration of the functions of the invention and can differ in accordance with the intension of a user or operator or the practice. Accordingly, the meanings of the terms should be interpreted on the basis of the contents of the specification.

In the DBMS-based knowledge extension and inference service system and the method for the same, ontology is used to create knowledge, the knowledge is extended by using an extension rule, and an inference service is provided through query processing, thereby proposing a framework which is stable and effective in all fields where the Semantic Web is utilized and an inference service needs to be provided. Therefore, it is possible to achieve the common use of the Semantic Web service.

As the Semantic Web technology develops, an inference service attracts attentions. In the invention, a method of implementing a stable DMBS-based Semantic Web platform without using an unstable inference engine will be described. The invention roughly comprises three methods. The first method is where ontology schemas and instances are used to create knowledge represented by triple. The second method is where knowledge extension rules are used to extend knowledge. The third method is where a user query is converted and query processing is performed so as to provide an inference service.

In the invention, unstable elements such as an endless loop in an inference and an unreliable response time are excluded, which might be caused by using an inference engine on ontology described by the OWL (web ontology language) or the like. Therefore, it is possible to provide a practical Semantic Web application service. For this, knowledge represented by a triple as well as ontology instances is stored and managed on the basis of the DMBS such that a large volume of knowledge processing can be guaranteed and stable knowledge extension can be performed.

Conventionally, attempts to use the DMBS have been made at a research level once in a while. In such attempts, however, the DMBS serves as only a storing place. Therefore, the DMBS is not closely combined with the overall information flow including knowledge creation, knowledge extension, and knowledge provision.

The inference service system according to the invention has a structure capable of processing a scale of knowledge, which cannot be handled by an inference engine, and can guarantee extension on knowledge. Further, the inference service system is designed to handle all knowledge which can be represented by a triple, thereby serving as an essential element under the Semantic Web environment.

Figure 3:
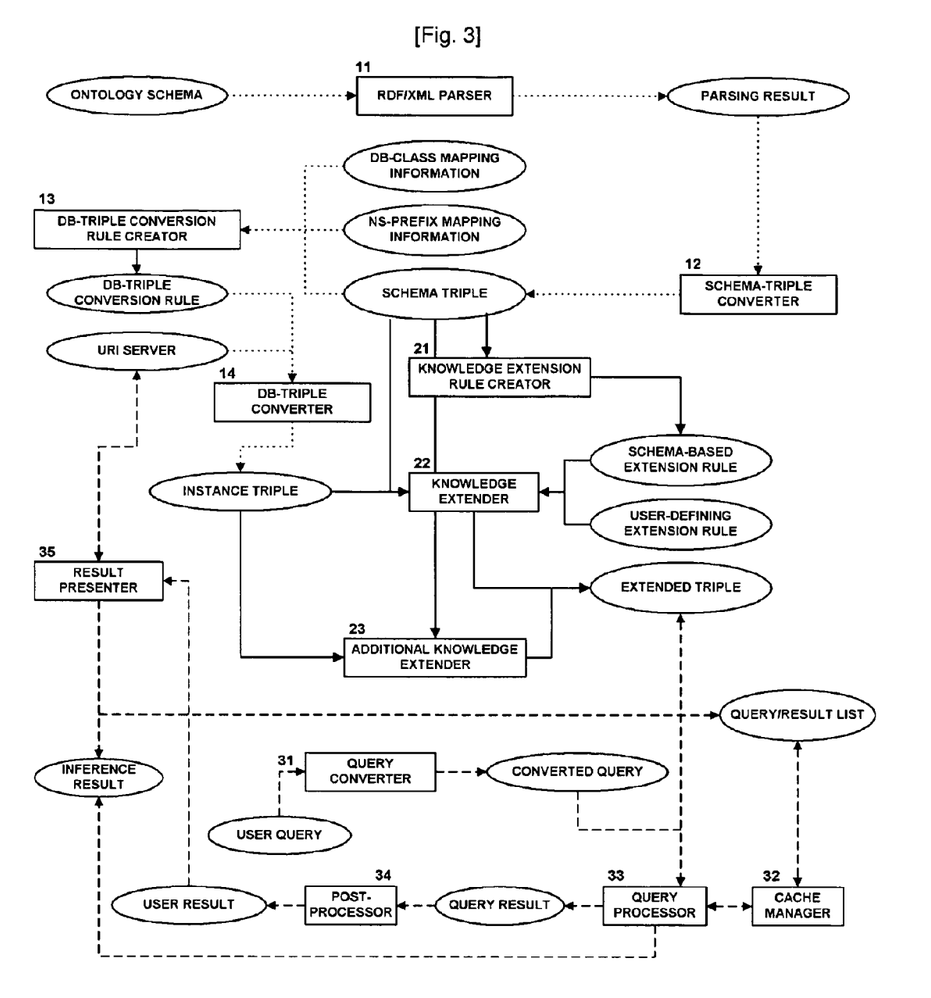
FIG. 3 is a conceptual view showing an information flow procedure of FIG. 1 or 2.

FIG. 3 shows an information flow of an entire system including the DMBS-based knowledge extension and inference service according to the invention. As shown in FIG. 3, the invention includes using ontology schemas and instances to create knowledge represented by a triple (ST11 to ST14), using knowledge extension rule to extend knowledge (ST21 to ST23), and converting a user query and performing query processing so as to provide an inference service (ST31 to ST35).

Ontology is a knowledge system for representing the relationship between classes (concepts) in a specific region, the ontology being composed of ontology schemas and ontology instances. The ontology schema can be referred to as a frame (for example, a concept of 'person' is connected to 'institute' through the relation of 'belongingness') for representing the relationship between concepts. The ontology instance can be referred to as an example of a specific concept (for example, 'Mr. Jung' is connected to 'KISTI (Korea Institute of Science and Technology Information)' through the relationship of 'belongingness').

The ontology schema is represented by RDF (Resource Description Framework) or XML (extensible Markup Language). In order to handle DMBS-based knowledge, the ontology schema and the ontology instance need to be united into another format such as a triple form or XML. The triple form includes three elements composed of two concepts and a relation name connecting the concepts and can be represented by such a form as ('person', belongingness', 'institute').

In the invention, the triple form is referred to as a triple for convenience of description. The triple form stored in the DBMS is also defined by a table including three fields such as a subject (which is a concept positioned in the left of a relation name and corresponds to 'person' of the above example), a predicate (which means a relation name and corresponds to 'belongingness' of the example), and an object (which is a concept positioned in the right of a relation name and corresponds to 'institute' of the example). Three of these elements can be respectively stored in separate tables, not one table. Further, the tables can be distributed in accordance with the relation name.

The RDF/XML parser 11 performs a basic operation for converting an ontology schema into a DMBS-based triple at a final stage. The RDF/XML parser 11 analyzes an ontology schema so as to create a parsing result (refer to FIG. 4). The parsing result is converted into a triple by the schema-triple conversion section 12.

Figure 4:
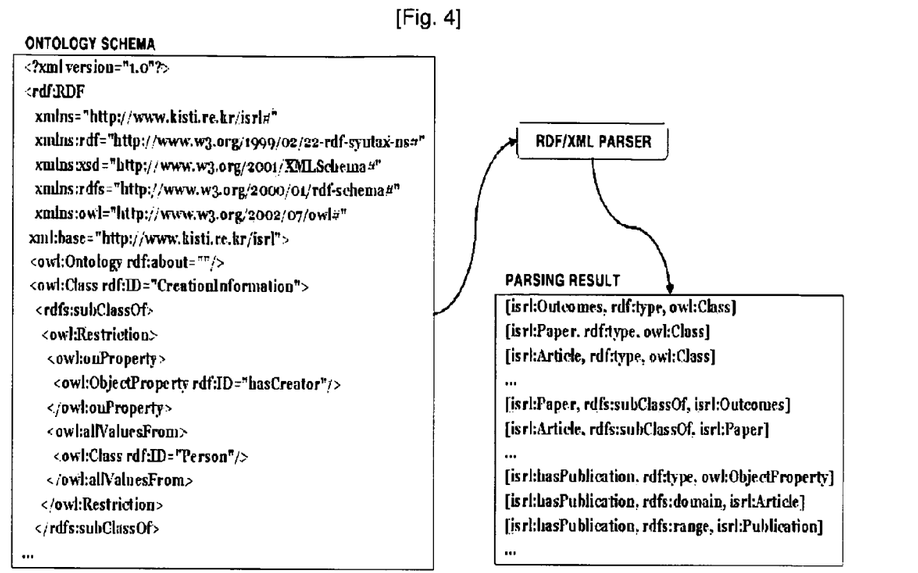
FIG. 4 is a diagram showing an ontology schema and an example of parsing result performed by an RDF/XML parser in FIG. 1 or 2.

As such, the schema triple is knowledge created from the converted result, which means an ontology schema is converted into a format which can be easily handled by the DMBS. The schema triple is knowledge which is necessarily required for creating an instance triple. This is because a schema triple represents an ontology schema and an ontology schema is basic information for analyzing an ontology instance.

In order to convert an ontology instance into an ontology triple, the DB-triple conversion rule creating section 13 is needed. The DB-triple conversion rule creating section 13 serves to create a conversion rule required for the DB-triple conversion. In this case, a schema triple, DB-class mapping information, NS (Name Space)-prefix mapping information and the like are used.

The DB-class mapping information informs how each field (field information corresponds to an ontology instance) stored in the URI (Uniform Resource Identifier) server is mapped into an ontology schema. For example, when a first field of a human power information table means a concept of 'person', information represented as "<f1> rdf:type isrl:Person" is included in the DB-class mapping information.

The URI server is a DBMS-based storing place which is used to effectively manage ontology instances, the URI server including a relation between concepts (object property) and a concept-value relation (a data-type property). The relation between concepts corresponds to a case where a concept of 'person' has a concept of 'institute' through the relation of 'belongingness'. The concept-value relation corresponds to a case where a concept of 'person' has a value of '30' through the relation of 'age'. The knowledge creation method can be implemented without using the URI server. In this case, the method follows the process where an ontology schema is converted into a schema triple.

The NS-prefix mapping information serves to map a name space into a prefix.

The name space serves to group concepts like "#", which are desired to be currently described, such that the concepts are not confused with other concepts. In a knowledge-description language such as OWL (Web Ontology Language) or RDF (Resource Description Framework), a prefix is used instead of the name space. For example, a prefix is used which is simply represented as "rdf". When logic group representation methods are different from each other, the NS-prefix mapping information is used to make the methods compatible with each other. For example, when ontology instances stored in a DBMS are represented on the basis of name space and rules and the like are described by the prefix, the NS-prefix information is used.

The DB-triple conversion rule creating section 13 creates a DB-triple conversion rule (refer to FIG. 5) by using DB-class mapping information, NS-prefix mapping information, and a schema triple. The DB-triple conversion section 14 converts an ontology instance stored in an URI server into an instance triple (refer to FIG. 6) by using the DB-triple conversion rule.

A knowledge extension method of the knowledge extension processing unit 20 shows a process where the above-described schema triple and instance triple are used so as to create a extended triple.

Figure 7:
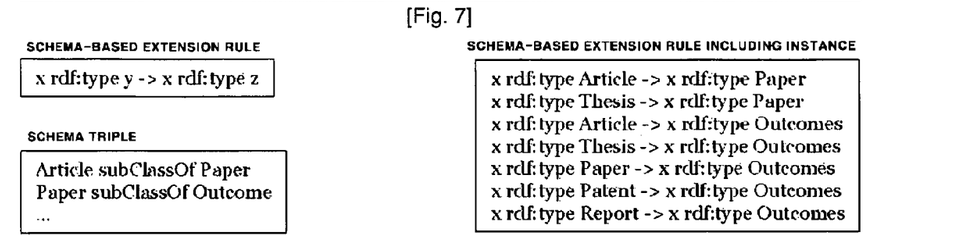
FIG. 7 is a diagram showing an example of schema-based extension rule in FIG. 1 or 2.
Figure 8:
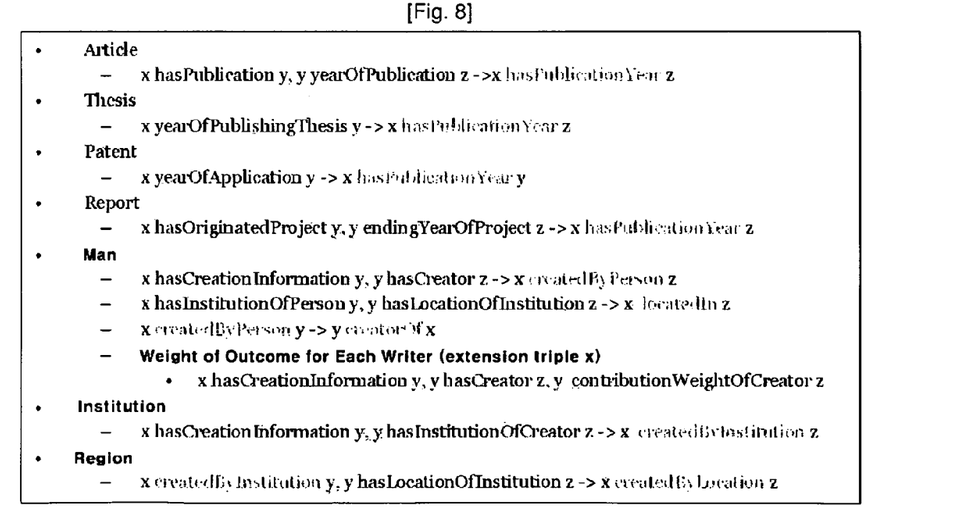
FIG. 8 is a diagram showing an example of user-defining extension rule in FIG. 1 or 2.

The knowledge extension rule creating section 21 automatically creates a rule for knowledge extension. In this case, a schema triple is referred to. As shown in FIG. 7, the schema triple is used to automatically create a schema-based extension rule. This method can be replaced with a manual operation. That is, an ontology schema is analyzed so that a schema-based extension rule can be manually created by an expert. The knowledge extending section 22 creates an extended triple by using the schema-based extension rule automatically-created by the knowledge extension rule creating section 21, a user-defining extension rule (refer to FIG. 8) described by a rule expert, and an instance triple. At this time, an additional knowledge extension section 23 is used to refer to the instance triple and schema triple, thereby adding an extended triple whose value is dynamically varied. In an extended triple of 'outcomes', whenever an outcome is registered, the point thereof should be accumulated. The additional knowledge extension section plays such a role.

In a word, an extended triple can be referred to as a result of enriching an instance triple in accordance with an extension rule. Further, the knowledge extending section 22 can be referred to as a module which analyzes a rule and additionally creates a triple through a scheme corresponding to forward chaining in an inference engine.

The above description is a method of creating and extending knowledge before a user query is made.

The process, where a user query is input and an inference is made by a system such that the result is created, is performed by the inference service providing unit 30. The detailed operation thereof will be described as follows.

A user query may be described in the form of SQL (Structured Query Language). In the Semantic Web, however, a Semantic Web-based query description language such as SPARQL (SPARQL Protocol and RDF Query Language) or RDQL (RDF Data Query Language) is generally used. In the present system where DBMS-based knowledge is constructed, a user query should be converted into SQL statements by the query converting section 31, in order to analyze and process the user query.

The converted query (refer to FIG. 9) composed of SQL statements is delivered to the query processing section 33. The query processing section 33 first inquires of the cache managing section 32 whether the corresponding query has been previously input or not. By referring to a cache composed of a query-result list, the cache managing section 32 determines whether the query is a previously-input query or not and delivers the result to the query processing section 33. If the query is a previously-input query, the query processing section 33 can immediately present an inference result. On the contrary, if the query is a newly-input query, the query processing section 33 creates a query result (refer to FIG. 10) by referring to the extended triple.

It is difficult to immediately present the query result to a user. That is because a query result having a form suitable for a user interface is not immediately obtained. For this, the post-processing section 34 is used so as to create a post-processing result (refer to FIG. 11).

The result presenting section 35 creates a message and protocol suitable for a user interface by using the post-processing result. At this time, the result presenting section 35 can refer to the URI server so as to secure a concept-value relation (data-type property) with respect to a specific URI. For example, the data-type property in a concept of 'person' includes 'name', 'age', 'sex' and the like. This result is an inference result (refer to FIG. 12). The inference result is represented by a formal language such as XML so as to be delivered to a module in charge of a user interface.

As described above, the knowledge creation method, the knowledge extension method, and the inference service provision service are closely connected to each other. Further, the inference service, which has been unstably performed by an existing inference engine, can be implemented as a stable DBMS-based service.

The construction of the invention will be arranged and described as follows.

1) DMBS-Based Knowledge Extension and Inference Service Method (Shown in FIG. 3)

The method of creating knowledge represented as a triple (or a substitute expression composed of two concepts and a relation name connecting the concepts, as a structure corresponding to the triple) by using the ontology schemas and instances, the method of extending knowledge by using a knowledge extension rule, the method of providing an inference service by converting a user query and processing the converted query, a method of integrating the respective roles, and the entire configuration of an integrated system.

Figure 5:
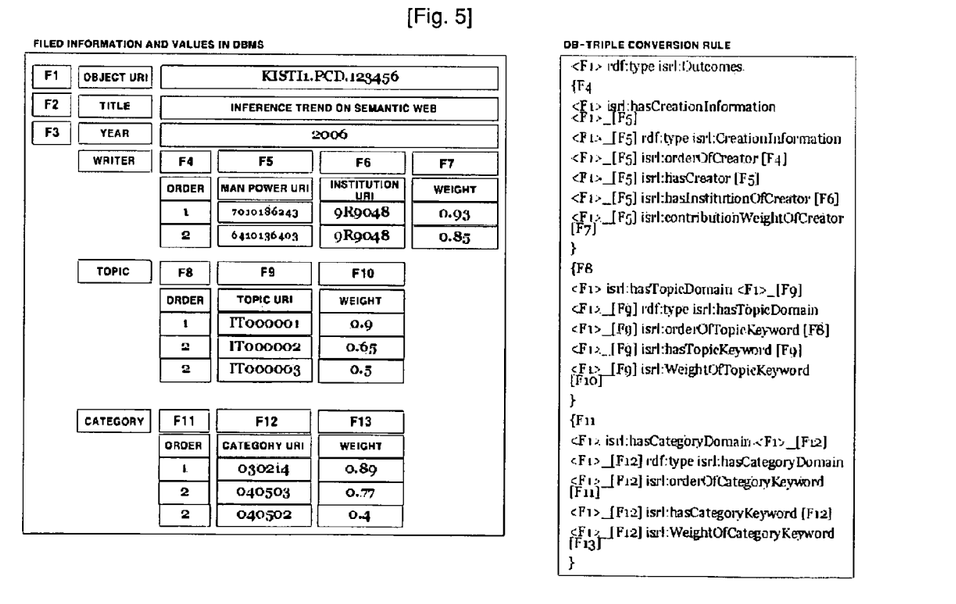
FIG. 5 is a diagram showing an example of DB-triple conversion rule creation in FIG. 1 or 2.
Figure 6:
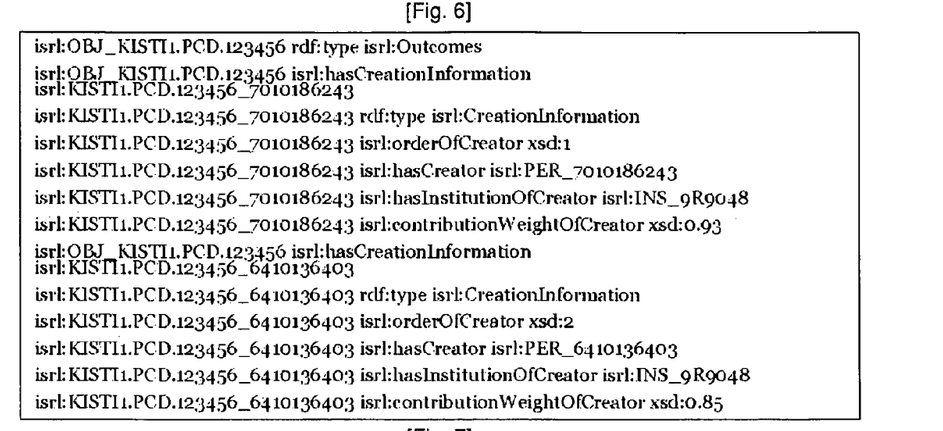
FIG. 6 is a diagram showing an example of instance triple created by the DB-triple conversion in FIG. 1 or 2.

2) DB-Triple Conversion Method (Shown in FIGS. 3, 5, and 6)

The method of converting an ontology instance into an instance triple, the ontology instance being stored in the URI server and being represented on the basis of URI or as a character string by using an ontology description language such as OWL (Web Ontology Language), and a method of integrating the respective roles.

3) Schema Triple Creating Method (Shown in FIGS. 3 and 4)

The method where the ontology schema represented by an ontology description language having the RDF or XML form is parsed by the RDF/XML parser so as to create the result and a schema triple is created by the schema triple converting section, and a method of integrating the respective roles.

4) DB-Triple Conversion Rule Creation Method (Shown in FIGS. 3 and 4)

The method of using a schema triple, DB-class mapping information, and NS-prefix mapping information so as to create the DB-triple conversion rule, the method of mapping a DBMS field into an ontology class corresponding to a concept by using the DB-class mapping information, a method of providing an editor screen and an editor such that the DB-class mapping information can be edited, the method of making a name space and a prefix compatible with each other by using the NS-prefix mapping information, the method of providing an editor screen and an editor such that the NS-prefix mapping information can be edited, the method of providing an editor screen and an editor such that a DB-triple conversion rule can be obtained, the DB-triple conversion rule being described by an ontology expert instead of the DB-triple conversion rule creating section, and a method of integrating the respective rules.

5) Knowledge Extension Method (Shown in FIG. 3)
The method of extending knowledge by using the schema triple and instance triple and creating an extended triple as the result, and a method of integrating the respective rules.

6) Knowledge Extension Rule Creation Method (Shown in FIGS. 3 and 7)
The method of creating a schema-based extension rule by using the schema triple, the method of providing an editor screen and an editor such that a schema-based extension rule can be obtained, the schema-based extension rule being described by an ontology expert instead of the schema-based extension rule creating section, and a method of integrating the respective rules.

7) Extended Triple Creation Method (Shown in FIGS. 3, 7, and 8)
The method where the schema triple and the instance ontology are received and a schema-based extension rule and a user-defining extension rule are analyzed to create an extended triple, and a method of integrating the respective rules.

8) Additional Knowledge Extension Method (Shown in FIG. 3)
The method where an instance triple is received, the value is calculated on a DMBS table or memory, and the corresponding triple is updated or added in order to process the triples in which the values of specific classes are varied, and a method of integrating the respective rules.

9) Inference Service Method (Shown in FIGS. 3, 9, 19, and 11)
The method of creating and providing an inference result from a user query through the query conversion, the query processing, and the post-processing, and a method of integrating the respective rules.

10) Query Conversion Method (Shown in FIGS. 3 and 9)
The method of converting a user query into SQL statements, the user query being represented as a specific statement dependent on a query description language, such as SPARQL or RDQL, or a user interface, and a method of integrating the respective rules.

11) Query Processing Method (Shown in FIGS. 3 and 10)
The method where a query converted into SQL statements is received and a query result is created by referring to a DBMS-based extended triple, the method of determining whether a query is a previously-input query or not through the cache managing section, the method of extracting an inference result of the corresponding query to provide to a user interface when the query is a previously-input query, the method of creating a query result by referring to an extended triple when the query is a newly-input query, and a method of integrating the respective rules.

12) Post-Processing Method (Shown in FIGS. 3 and 11)
The method of arranging and filtering query results (removing some of results by applying a specific standard) such that the query results are suited for a user interface and then creating a post-processing result, and a method of integrating the respective rules.

13) Inference Result Creation Method (Shown in FIG. 3)
The method of creating a inference result by using the post-processing result or the query result, the method of extracting a value connected to a concept-value relation (data-type property) of an inference result creation target URI by referring to the URI server, and a method of integrating the respective rules.

14) Method of Constructing Semantic Web Application Service by Using DBMS-Based Knowledge Extension and Inference Service (Shown in FIG. 3)
The method of constructing the Semantic Web application service by using the entire system or portions of the system, and a method of integrating the respective rules.

As described above, ontology is used to create knowledge, the knowledge is extended by using an extension rule, and an inference service is provided through query processing, thereby proposing a framework which is stable and effective in all fields where the Semantic Web is utilized and an inference service needs to be provided. Therefore, it is possible to achieve the common use of the Semantic Web service.

The invention claimed is:
1. A DBMS-based knowledge extension and inference service method recorded on a computer-readable medium comprising:
creating knowledge represented as a triple by using ontology schemas and instances (first step);
receiving the knowledge created in the first step and extending the knowledge by using a knowledge extension rule (second step); and
providing an inference service by using the knowledge extended in the second step, converting a user query, and processing the query (third step),
wherein the third step comprises:
receiving and converting a user query so as to create the converted query (31st step);
determining whether the query is a previously-input query (32nd step);
receiving the query converted in the 31st step and the determination result of the 32nd step so as to create a query result (33rd step);
receiving the query result of the 33rd step and performing post-processing so as to create a post-processing result (34th step); and
creating a message and protocol suitable for a user interface by using the post-processing result created in the 34th step and then presenting an inference result.

2. The DBMS-based knowledge extension and inference service method recorded on a computer-readable medium according to claim 1, wherein the first step includes:
performing RDF/XML parsing on an ontology schema so as to output a parsing result (eleventh step);
receiving the parsing result output in the eleventh step so as to perform schema-triple conversion (twelfth step);
receiving the schema-triple converted in the twelfth step, DB-class mapping information, and NS-prefix mapping information so as to create a DB-triple conversion rule (thirteenth step); and
converting an ontology instance stored in an URL server into an instance triple by using the DB-triple conversion rule created in the thirteenth step (fourteenth step).

3. The DBMS-based knowledge extension and inference service method recorded on a computer-readable medium according to claim 2, wherein, in the eleventh step, a basic operation for converting an ontology schema into a DBMS-based triple is performed, and an ontology schema is analyzed so as to output a parsing result.

4. The DBMS-based knowledge extension and inference service method recorded on a computer-readable medium according to claim 2, wherein, in the twelfth step, an ontology schema is converted into a form which can be handled by a DBMS.

5. The DBMS-based knowledge extension and inference service method recorded on a computer-readable medium according to claim 2, wherein the thirteenth step includes:
using a schema triple, DB-class mapping information, and NS-prefix mapping information so as to create a DB-triple conversion rule;
mapping a DBMS field into an ontology class corresponding to a concept by using the DB-class mapping information;
providing an editing screen and an editor such that the DB-class mapping information is edited;
making a name space and a prefix compatible with each other by using the NS-prefix mapping information;
providing an editing screen and an editor such that the NS-prefix mapping information is edited; and
providing an editing screen and an editor such that a DB-triple conversion rule described by an ontology expert is obtained.

6. The DBMS-based knowledge extension and inference service method recorded on a computer-readable medium according to claim 2, wherein, in the fourteenth step, the ontology instance is converted into an instance triple, the ontology instance being stored in the URI server or being represented on the basis of URI or as a character string by using an ontology description language based on OWL and a topic map.

7. The DBMS-based knowledge extension and inference service method recorded on a computer-readable medium according to claim 1, wherein the second step includes:
creating a schema-based extension rule (21st step);
using the schema-based extension rule created in the 21st step and a user-defining extension rule described by an expert and creating an extended triple by using an instance triple and a schema triple (22nd step); and
creating an extended trip, of which the value is dynamically changed, by using the instance triple and the result of the 22nd step (23rd step).

8. The DBMS-based knowledge extension and inference service method recorded on a computer-readable medium according to claim 7, wherein, in the 21st step, the schema-based extension rule is created by referring to the schema triple of the first step.

9. The DBMS-based knowledge extension and inference service method recorded on a computer-readable medium according to claim 7, wherein, in the 22nd step, rule analysis and additional creation of triple are performed in a scheme corresponding to forward chaining of an inference engine.

10. The DBMS-based knowledge extension and inference service method recorded on a computer-readable medium according to claim 7, wherein the 23rd step includes:
receiving the instance triple and calculating the value on a DBMS table or memory such that triples, in which the values of specific classes arc dynamically changed, are processed; and
updating or adding the corresponding triple.

11. The DBMS-based knowledge extension and inference service method recorded on a computer-readable medium according to claim 1, wherein the 31st step includes converting the user query into SQL statements such that the user query approaches DBMS-based knowledge, the user query being represented as a specific statement dependent on a query description language such as SPARQL or RDQL or a user interface.

12. The DBMS-based knowledge extension and inference service method recorded on a computer-readable medium according to claim 1, wherein, in the 32nd step, a cache composed of a query/result list is referred to in order to determine whether the query is a previously-input query or not.

13. The DBMS-based knowledge extension and inference service method recorded on a computer-readable medium according to claim 1, wherein, in the 33rd step, when the query is a previously-input query, an inference result is immediately presented, and when the query is a newly-input query, a query result is created by referring to the extended triple of the second step.

14. The DBMS-based knowledge extension and inference service method recorded on a computer-readable medium according to claim 1, wherein the 34th step includes arranging the query results presented in the 33rd step such that the query results are suited for an user interface, performing filtering by removing some of the results through the application of specific reference, and creating a post-processing result.

15. The DBMS-based knowledge extension and inference service method recorded on a computer-readable medium according to claim 1, wherein, in the 35th step, an inference result is created by using the query result of the 33rd step or the post-processing result of the 34th step, and a value connected to a concept-value relation of an inference result creation target URI is extracted by referring to the URI server so as to present the inference result.

* * * * *